(12) United States Patent
Van Hoof et al.

(10) Patent No.: US 8,680,774 B2
(45) Date of Patent: Mar. 25, 2014

(54) ELECTRONIC SYSTEM AND AN ELECTRONIC MODULE THEREFOR

(75) Inventors: Willem Piet Van Hoof, Horst (NL); Ramon Pascal van Gorkom, Eindhoven (NL); Marcus Jozef Van Bommel, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 118 days.

(21) Appl. No.: 13/508,555

(22) PCT Filed: Nov. 10, 2010

(86) PCT No.: PCT/IB2010/055106
§ 371 (c)(1),
(2), (4) Date: May 8, 2012

(87) PCT Pub. No.: WO2011/061661
PCT Pub. Date: May 26, 2011

(65) Prior Publication Data
US 2012/0223654 A1 Sep. 6, 2012

(30) Foreign Application Priority Data
Nov. 19, 2009 (EP) .................................. 09176434

(51) Int. Cl.
*H05B 37/02* (2006.01)

(52) U.S. Cl.
USPC ......... 315/209 R; 315/278; 315/363; 362/648

(58) Field of Classification Search
None
See application file for complete search history.

(56) References Cited

U.S. PATENT DOCUMENTS

| 7,507,005 | B1* | 3/2009 | Mier-Langner | 362/418 |
|---|---|---|---|---|
| 2004/0175281 | A1* | 9/2004 | Remington | 417/360 |
| 2005/0146899 | A1* | 7/2005 | Joseph et al. | 362/648 |
| 2012/0044691 | A1* | 2/2012 | Covaro | 362/249.07 |
| 2013/0093259 | A1* | 4/2013 | Hente et al. | 307/104 |

FOREIGN PATENT DOCUMENTS

| WO | 2008012702 A1 | 1/2008 |
|---|---|---|
| WO | 2008135942 A1 | 11/2008 |

* cited by examiner

*Primary Examiner* — Jany Richardson
(74) *Attorney, Agent, or Firm* — Mark L. Beloborodov

(57) ABSTRACT

An electronic system comprises at least a base part, a power source and at least one electronic module adapted to be powered by the power source. The base part is provided with at least two parallel extending, elongated tracks being electrically conductive. At least one parameter of the electronic module is changeable by amending the distance of the electronic module to a predetermined location on the tracks.

10 Claims, 8 Drawing Sheets

ELECTRONIC SYSTEM AND AN ELECTRONIC MODULE THEREFOR

FIELD OF THE INVENTION

The invention relates to an electronic system comprising at least a base part, a power source and at least one electronic module adapted to be powered by the power source.

BACKGROUND OF THE INVENTION

In such an electronic system, which is known from WO2008/012702, filed by current applicant, the base part is provided with a number of primary coils, whilst the electronic module is provided with a secondary coil. The electronic module can be positioned on the base part, in which case power is transmitted from the primary coils to the secondary coil to power a light element of the electronic module. A disadvantage of this known system is that it is relatively difficult for a user to amend the power to the light element in order to be able to dim the light.

SUMMARY OF THE INVENTION

It is an object of the invention to provide an electronic system which enables a parameter of the electronic module to be easily and intuitively amended.

This object is achieved by the electronic system according to the invention in that the base part is provided with at least two parallel extending, elongated tracks being electrically conductive, wherein at least one parameter of the electronic module is changeable by amending the distance of the electronic module to a predetermined location on the tracks.

When a user repositions the electronic module on the tracks such that the distance thereof to the predetermined location on the tracks is different, he will notice that the parameter of the electronic module has changed. The parameter may, for example, be the power output of the electronic module. In the case that the electronic module comprises a light element he will notice that the further the electronic module is away from a predetermined location on the track, the less light will be transmitted by the light element, since less power is transmitted to the electronic module. By means of the electronic system according to the invention, an intuitive control of the power output is obtained. Also other parameters like color of the light, volume of an audio device, and temperature can be changed.

An embodiment of the electronic system according to the invention is characterized in that the electronic module is provided with at least two contacting elements, each adapted to interact with one of the tracks at a plurality of positions along the tracks, wherein the parameter is the power to the electronic module, which power decreases with an increase of the distance to the predetermined location on the tracks.

The power can be transmitted from a power source to the electronic module via the tracks or can be transmitted to an electronic element of the electronic module by a battery of the electronic module.

Another embodiment of the electronic system according to the invention is characterized in that at the predetermined location the tracks are connected to the power source, and each track has a relatively high electric resistance of at least 1 Ohm/square, due to which the power to the electronic module decreases with an increase of the distance of the electronic module to the power source.

Due to the relatively high electric resistance of at least 1 Ohm/square and preferably between 1-5 Ohm/square, the power to the electronic module will automatically decrease when the distance increases to the location where the tracks are connected to the power source. For a user it will be intuitively clear that the further away the electronic module is from the power source, the less power will be available at the electronic module.

Another embodiment of the electronic system according to the invention is characterized in that the electronic system is provided with control means to calculate the electric resistance between the electronic module and the predetermined location via the tracks to determine the position of the electronic module on the tracks and to amend at least one parameter of the electronic module, depending on the distance between the calculated position and the predetermined location on the tracks.

By applying a known voltage on the tracks and measuring the current, the electric resistance can easily be calculated. Based on the calculated electric resistance, the distance between the calculated position and the predetermined location on the tracks can be determined and the parameter can be changed. This embodiment is particularly suitable for tracks with a relatively low electric resistance, and the predetermined location need not be determined by the location where the tracks are connected to the power source but can be chosen by the person installing the electronic system. The predetermined location will be chosen so that it will be logical and intuitive for a user. In the case that the electronic module comprises a light element, it is for example possible to provide the light element with more power by placing the electronic module further away from a window. Also a dimmer on the electronic module or at the power source can be activated, based on the distance between the calculated position and the predetermined location on the tracks.

The power will be transmitted to the electronic module by other means than the tracks.

Yet another embodiment of the electronic system according to the invention is characterized in that the parameter of the electronic module, being the power, color, color temperature, hue or saturation etc, can be changed by the control means, depending on the distance between the calculated position and the predetermined location on the tracks.

Any parameter of the electronic module can be chosen to be changed by the control means, in which case the parameter will be changed by amending the distance from the electronic module to the predetermined location. Also these amendments can be chosen so as to feel logical to the user. So, for example, the brighter the light source, the higher the color temperature; the further away from the predetermined location, the less saturation, etc. The color itself can be changed following the colors of a rainbow changing from red to orange to yellow to green to blue to purple, the further the electronic module is away from the predetermined location.

A further embodiment of the electronic system according to the invention is characterized in that the power source comprises a number of primary coils located along at least one of the tracks, while the electronic module comprises a secondary coil interacting with at least one of the primary coils.

In this way the power will be transmitted by induction.

Yet another embodiment of the electronic system according to the invention is characterized in that the power to the electronic module linearly decreases with an increase of the distance to the predetermined location on the tracks.

Such a linear decrease will feel logical to a user. However, if desired it is also possible to have another relation between the power and the distance in the case that control means are being used.

Another embodiment of the electronic system according to the invention is characterized in that each track comprises an indium tin oxide (ITO) film.

Such a film is transparent and will be almost invisible to a user, so that it will not mar the wall or device on which the base part is attached. This provides more freedom in the design of the electronic system. Furthermore, if the tracks are clearly visible a user might have the feeling that touching the tracks is unsafe or dangerous. However, in the case that a low voltage is applied to the tracks there is no risk that a user will get an electric shock. By using almost invisible tracks this feeling of a user will be reduced. ITO has a relatively high electric resistance which renders it very suitable for determining the position of the electronic module with respect to the predetermined location.

Yet another embodiment of the electronic system according to the invention is characterized in that the base part and the electronic module are releasably magnetically attached to each other.

In this manner the electronic module can easily be repositioned with respect to the base part.

Yet another embodiment of the electronic system according to the invention is characterized in that the electronic module comprises a light element.

The light element can easily be dimmed by placing the electronic module at another location on the tracks.

BRIEF DESCRIPTION OF THE DRAWINGS

The invention will be explained in more detail with reference to the drawings, in which.

Like parts are indicated by the same reference numbers in the Figures.

DETAILED DESCRIPTION OF EMBODIMENTS

Figure 1:
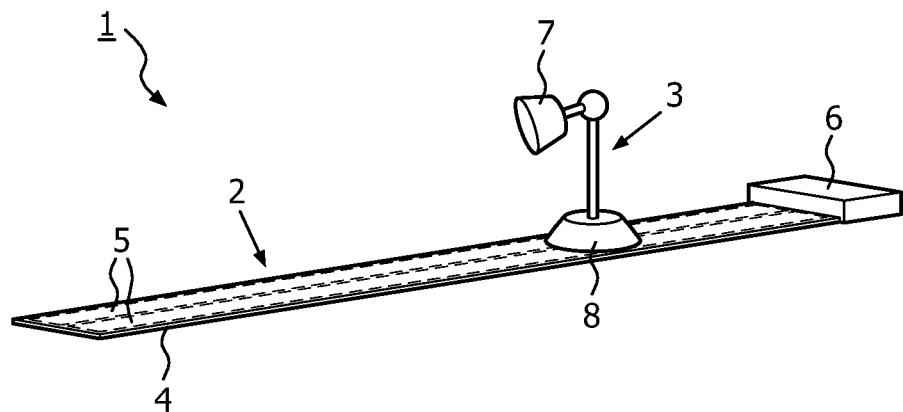
FIG. 1 is a perspective view of an electronic system according to the invention.
Figure 2A:
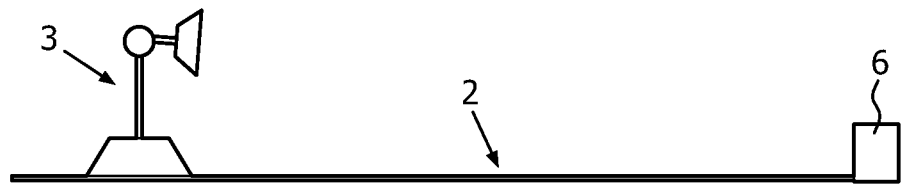
FIGS. 2A and 2B are a side view and top view, respectively, of the electronic system as shown in FIG. 1.
Figure 2B:
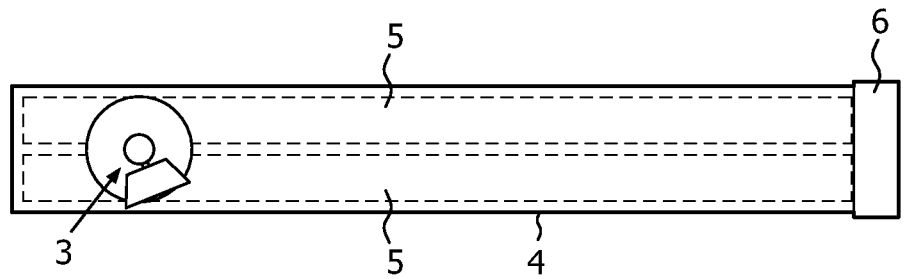

FIGS. 1, 2A, 2B and 3 show different views of an electronic system 1 according to the invention. The electronic system 1 comprises a base part 2 and an electronic module 3. The base part 2 is provided with a carrier 4 and two longitudinal films 5 of ITO. The films 5 extend parallel to each other and are connected near one end to a power source 6. The power source 6 might comprise batteries or might be a low voltage source connected to the mains.

The electronic module 3 comprises a light element 7 positioned on the tracks 5 by means of a foot 8.

Figure 3:
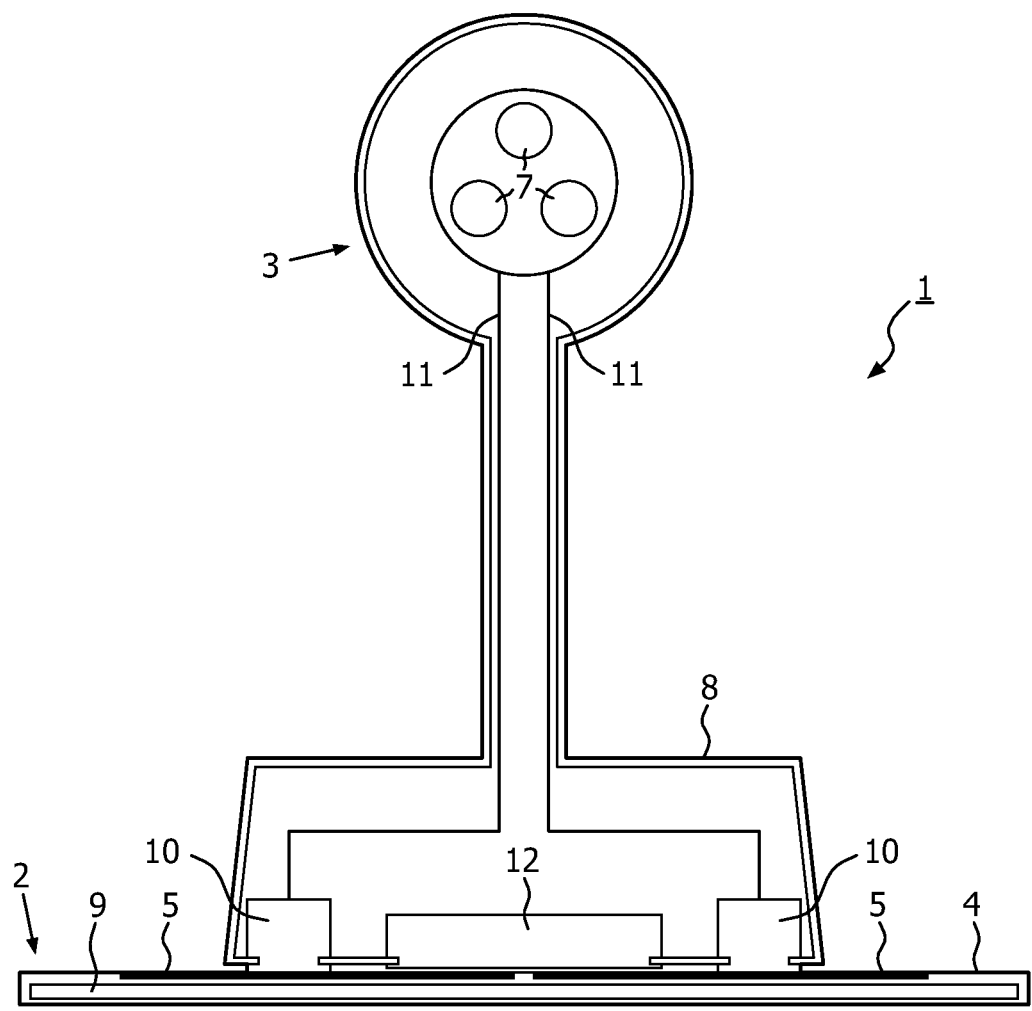
FIG. 3 is a cross section of the electronic system as shown in FIG. 1.
Figure 12A:
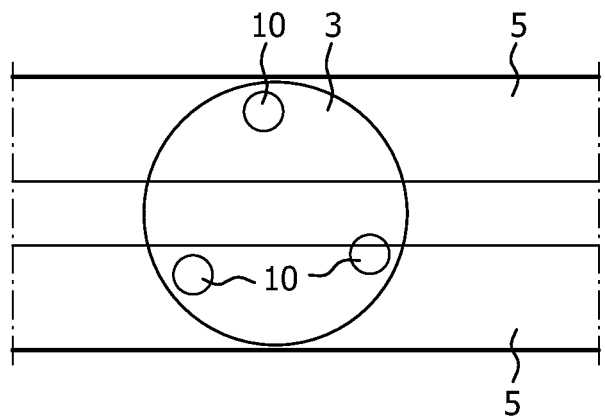
FIGS. 12A and 12B are top views of the electronic system according to the invention, with different orientations of the electronic module with respect to the tracks.
Figure 12B:
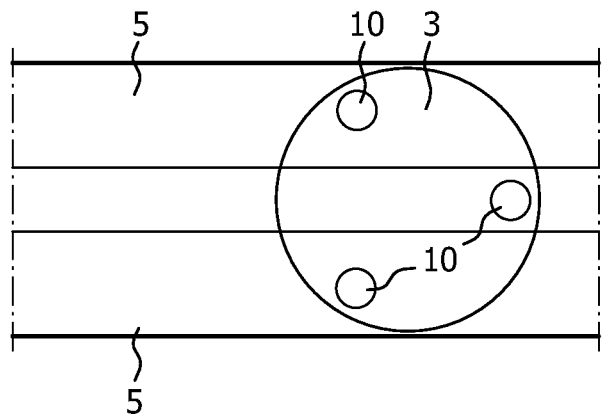

FIG. 3 shows a cross section of the electronic system 1 according to the invention. The carrier 4 of the base part 2 is provided with a ferromagnetic layer 9 located below the tracks 5. The electronic module 3 is provided with two contacting elements 10 located at a distance from each other, which distance is almost equal to the distance between the central axes of the tracks 5. The contacting elements 10 are connected to the light element 7 by means of wires 11. Between the contacting elements 10 a permanent magnet 12 is located. The electronic module 3 is releasably attached to the base part 2 by means of magnetic forces between the permanent magnet 12 and the ferromagnetic layer 9. By attaching the electronic module 3 to the base part 2, the contacting elements 10 are positioned against the tracks 5 and are electrically connected therewith. The tracks 5 and the electronic module 3 may comprise mechanical means to orientate the electronic module 3 with respect to the tracks. It is also possible to provide the electronic module 3 with several contacting elements 10 (see FIGS. 12A and 12B), such that each contacting element 10 is in contact with one track 5 or none of the tracks 5, but never with both tracks. By using an electronic circuit, short circuits between two contacting elements 10 on the same track 5 can easily be prevented.

The electric resistance of the tracks 5 is relatively high, for example 1-5 Ohm/square, due to which the placement of the electronic module 3 at a larger distance from the power source 6 will automatically result in less power to the electronic module 3 and therefore less light emitted by the light element 7.

Figure 4:
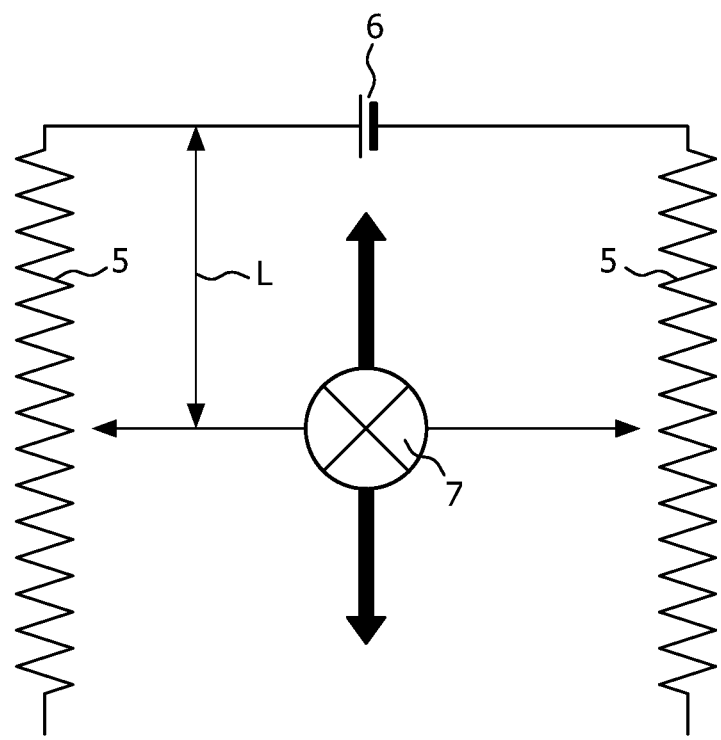
FIG. 4 is a schematic view of the working principle of the electronic system as shown in FIGS. 1-3.

FIG. 4 shows schematically the electronic system 1 according to the invention. As will be clear, the larger the distance L, the larger the resistance Rtrack of the tracks 5 will be. For example, an ITO film is used with a thickness of 240 nm, a width W of 4 cm and a resistivity Rsquare of 5 Ohm/square. The optical transmittance of the ITO film is 80%. In this example the minimum track length L is 5 cm and the maximum track length L is 100 cm.

The resistance Rtrack can be calculated as follows:

$$R\text{track} = R\text{square} * \text{length } L/\text{width } W.$$

This means that the resistance Rtrack is 6.25 Ohm if the length L=0.05 m and Rtrack is 125 Ohm if the length L=1 m. The light element 7 has a resistance Rlamp of 54 Ohm, for example. If a low voltage of 24 Volt is applied by means of the power source 6, the current I through the light element 7 will be 24/(2*6.25+54)=0.36 A for L=0.05 m and 24/(2*125+54)=0.08 A for L=1 m. The power Plamp supplied to the light element 7 is I*I*Rlamp and will be 7.03 W for L=0.05 m and 0.34 W for L=1 m.

Figure 6:
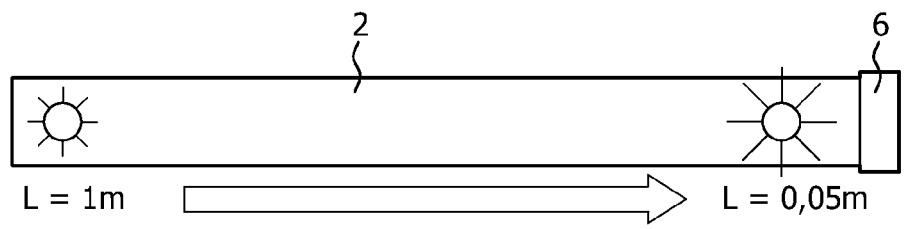
FIG. 6 is a top view of the electronic system as shown in FIG. 1 or 5, showing the dimming of the light emitted by the electronic module.

Thus, more light is emitted by the light element 7 for L=0.05 m than for L=1 m, as is schematically shown in FIG. 6.

Figure 5:
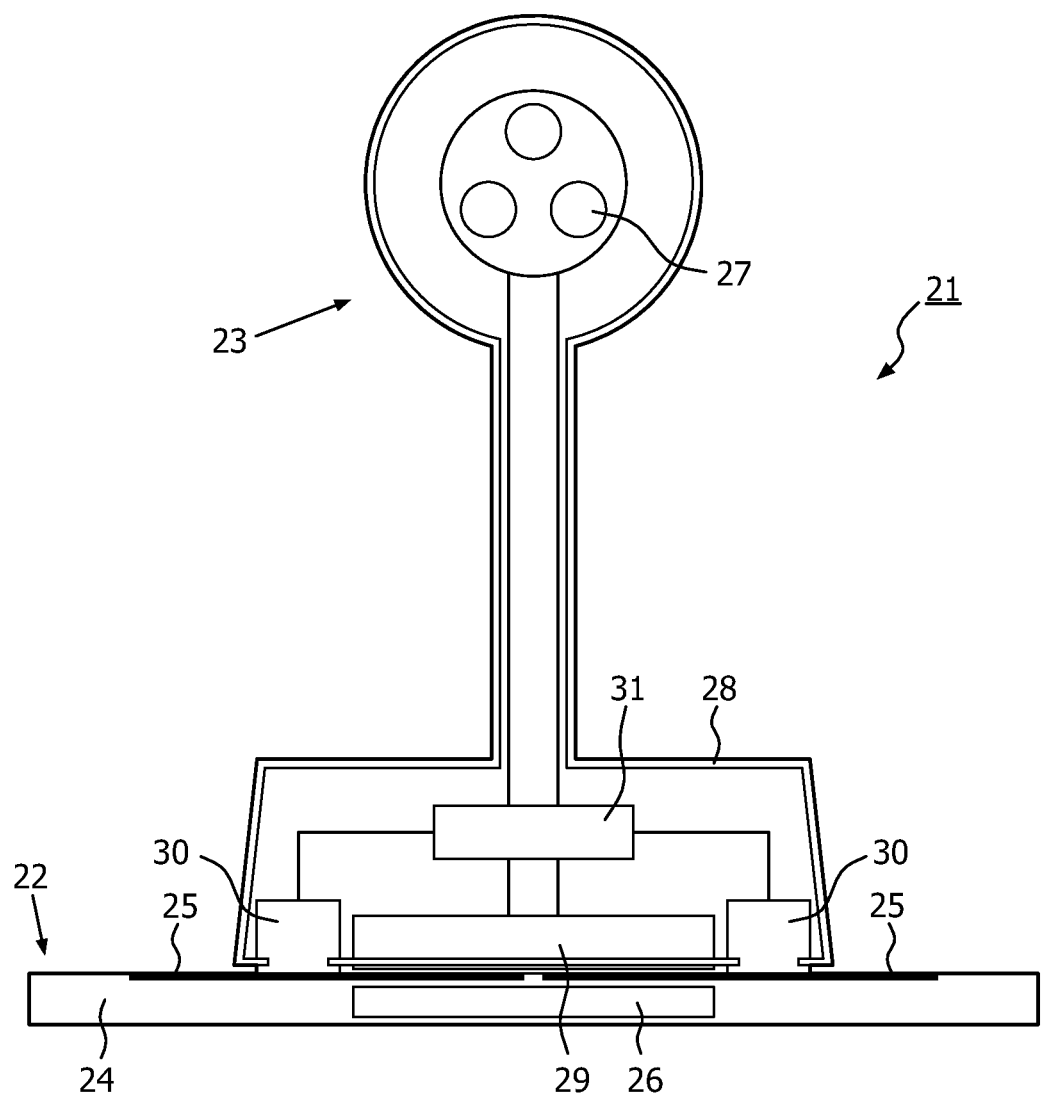
FIG. 5 is a cross section of another embodiment of the electronic system according to the invention.

FIG. 5 shows a cross section of a second embodiment of an electronic system 21 according to the invention. The electronic system 21 comprises a base part 22 and an electronic module 23. The base part 22 is provided with a carrier 24 and two longitudinal films 25 of ITO. The films 25 extend parallel to each other and are connected near one end to an additional power source (not shown). The base part 22 is further provided with a number of primary coils 26 located below the tracks 25 in a row extending parallel to the tracks 25 and powered by a mains power source.

The electronic module 23 comprises a light element 27 positioned on the tracks 25 by means of a foot 28. The electronic module 23 is provided with two contacting elements 30 located at a distance from each other, which distance is almost equal to the distance between the central axes of the tracks 25. The contacting elements 30 are connected to a control means 31. The electronic module 23 is also provided with a secondary coil 32 located between the contacting elements 30. The secondary coil 32 and the light element 27 are connected to the control means 31. In the case that the base part 22 extends horizontally, the electronic module 23 can be releasably located and connected to the base part 22 by means of gravity. By positioning and attaching the electronic module 23 on the base part 22, the contacting elements 30 are positioned against the tracks 25 and are electrically connected therewith. By means of the control means 31, the position of the electronic module 23 with respect to a predetermined location on the tracks 25 can be calculated, for example based on the voltage applied and the current as measured. Power will be transmitted by the primary coils 26 to the secondary coil 29. Based on the distance to the predetermined location, the desired amount of power is transmitted to the light element 27 by the control means 31. By means of the control means 31 also other parameters of the light element 27 like the color, color temperature, hue, saturation etc. may be amended.

Figure 7:
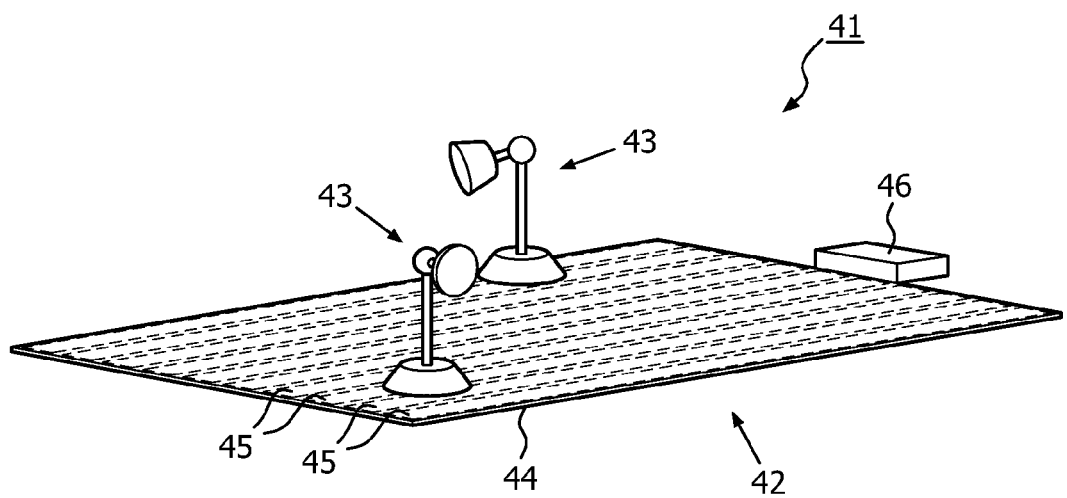
FIG. 7 is a perspective view of another electronic system according to the invention, comprising multiple tracks.

FIG. 7 shows a perspective view of a third embodiment of an electronic system 41 according to the invention comprising a base part 42 and two electronic modules 43. The base part 42 is provided with a carrier 44 and a plurality of parallel tracks 45 connected near one end to a power source 46. Each electronic module 43 will interact with two adjacent tracks 45 in order to be supplied with power.

Figure 8:
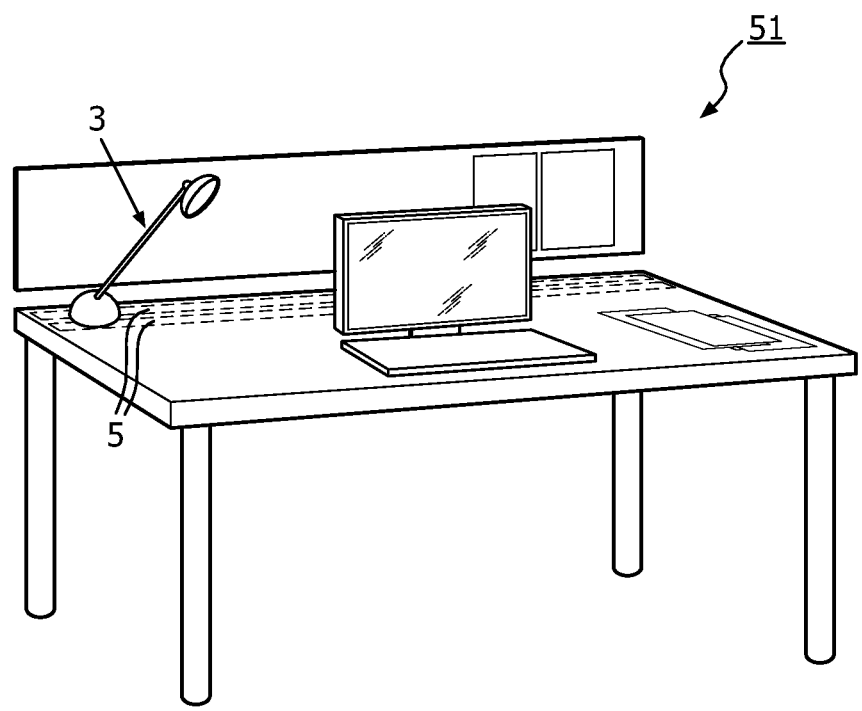
FIG. 8 is a perspective view of an application of the electronic system according to the invention.

FIG. 8 shows an application of the electronic system 1 according to the invention, in which the tracks 5 are mounted on a desk 51. A user may move the electronic module 3 from the left to the right, thereby automatically causing the amount of emitted light to be amended.

Figure 9:
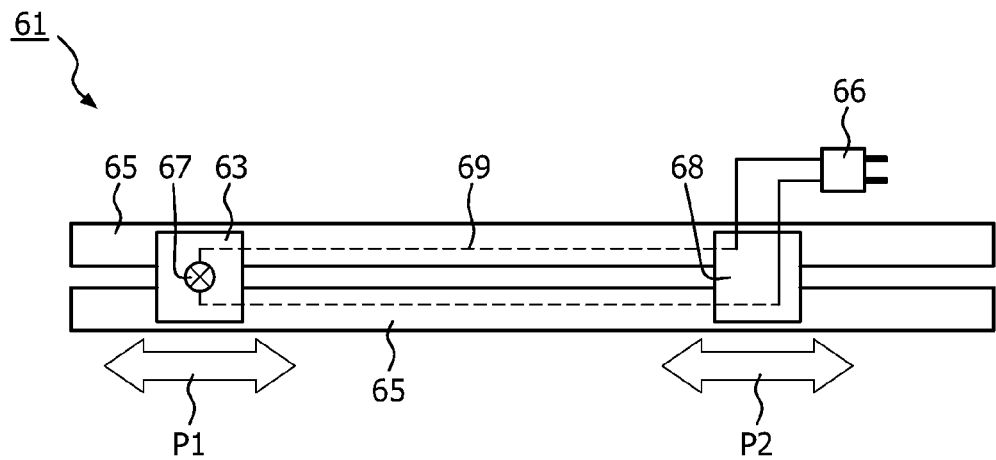
FIGS. 9-11 are top views of three further embodiments of the electronic system according to the invention.

FIG. 9 shows an embodiment of the electronic system 61 according to the invention, comprising two tracks 65 on which an electronic module 63 with a light element 67 is mounted. The electronic module 63 is movable along the tracks 65 in the directions indicated by the double arrow P1. The electronic system 61 further comprises a power source 66 mounted by means of a power module 68 on the tracks 5. The power module 68 is movable along the tracks 65 in the directions indicated by the double arrow P2. Between the power module 68 and the electronic module 63, a power circuit 69 is present. The electronic module 63 or the power module 68 is provided with control means to calculate the electric resistance of the tracks 65 between the power module 68 and the electronic module 63 in order to be able to determine the distance between the power module 68 and the electronic module 63. A user can change the position of the electronic module 63 as well as the position of the power module 68 to change the distance between them and to change a parameter of the electronic module 63.

Figure 10:
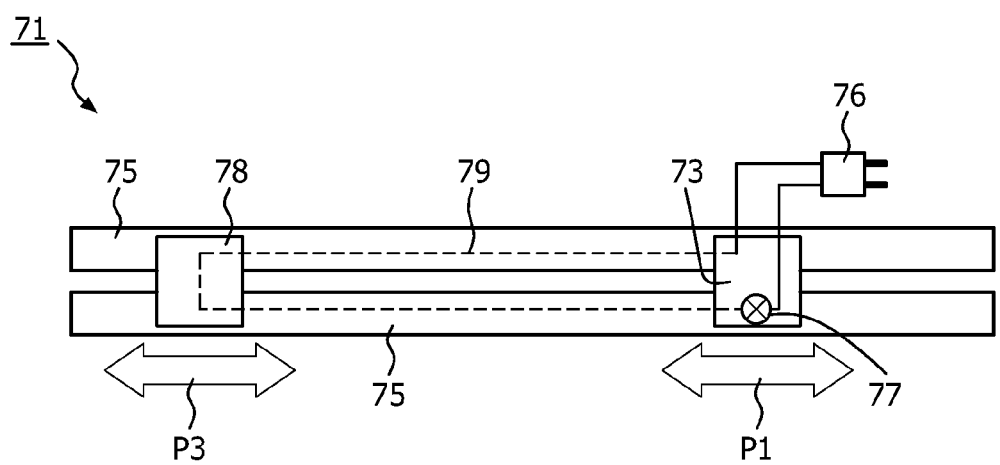

FIG. 10 shows an embodiment of the electronic system 71 according to the invention, comprising two tracks 75 on which an electronic module 73 with a light element 77 is mounted. The electronic module 73 is movable along the tracks 65 in the directions indicated by the double arrow P1. The electronic module 73 further comprises a power source 76. The electronic system 71 further comprises a control module 78 being movable along the tracks 75 in the directions indicated by the double arrow P3. Between the control module 78 and the electronic module 73, a power circuit 79 is present. The electronic module 73 or the control module 78 is provided with control means to calculate the electric resistance of the tracks 75 between the control module 78 and the electronic module 73 in order to be able to determine the distance between the power module 78 and the electronic module 73. A user can change the position of the electronic module 73 as well as the position of the control module 78 to change the distance between them and to change a parameter of the electronic module 73.

Figure 11:
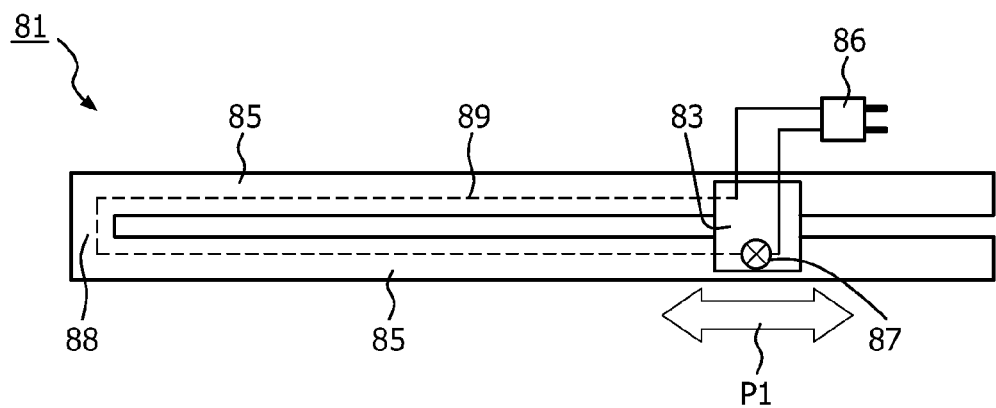

FIG. 11 shows an embodiment of the electronic system 81 according to the invention, comprising two tracks 85 on which an electronic module 83 with a light element 77 is mounted. The electronic module 83 is movable along the tracks 85 in the directions indicated by the double arrow P1. The electronic module 83 further comprises a power source 86. The two parallel tracks 85 are connected to each other at one end 88. Between the end 88 and the electronic module 83 a power circuit 89 is present. The electronic module 83 is provided with control means to calculate the electric resistance of the tracks 85 between the end 88 and the electronic module 83 in order to be able to determine the distance between the end 88 and the electronic module 83. A user can change the position of the electronic module 83 to change the distance between the end 88 and the electronic module 83 and to change a parameter of the electronic module 83.

It is also possible to use tracks comprising other materials like gold, silver etc. having a relatively low electric resistance.

The electronic module 23 may comprise other electronic elements like an audio device, wherein the volume of the audio device is changed when the distance to a predetermined location on the tracks is amended.

The invention claimed is:

1. Electronic system comprising a base part, a power source and at least one electronic module adapted to be powered by the power source, wherein the base part comprises at least two parallel extending, elongated tracks being electrically conductive, wherein at least one parameter of the electronic module is changeable by amending the distance of the electronic module to a predetermined location on the tracks.

2. Electronic system according to claim 1, wherein the electronic module comprises at least two contacting elements, each adapted to interact with one of the tracks at a plurality of positions along the tracks, wherein the parameter is the power to the electronic module, which power decreases with an increase of the distance to the predetermined location on the tracks.

3. Electronic system according to claim 2, wherein at the predetermined location the tracks are connected to the power source, and each track has a relatively high electric resistance of at least 1 Ohm/square, such that the power to the electronic module decreases with an increase of the distance of the electronic module to the power source.

4. Electronic system according to claim 1, wherein the electronic system comprises control means to calculate the electric resistance between the electronic module and the predetermined location via the tracks in order to determine the position of the electronic module on the tracks and to amend at least one parameter of the electronic module, depending on the distance between the calculated position and the predetermined location on the tracks.

5. Electronic system according to claim 4, wherein the parameter of the electronic module selected from the group consisting of the power, color, color temperature, hue and saturation etc, can be changed by the control means, depending on the distance between the calculated position and the predetermined location on the tracks.

6. Electronic system according to claim 4, wherein the power source comprises a number of primary coils located along at least one of the tracks, while the electronic module comprises a secondary coil interacting with at least one of the primary coils.

7. Electronic system according to claim 4, wherein the power to the electronic module linearly decreases with the increase of the distance to the predetermined location on the tracks.

8. Electronic system according to claim 4, wherein each track comprises an indium tin oxide (ITO) film.

9. Electronic system according to claim 4, wherein the base part and the electronic module are releasably magnetically attached to each other.

10. Electronic system according to claim 4, wherein the electronic module comprises a light element.

* * * * *